United States Patent [19]

Sheffield

[11] Patent Number: 4,821,793
[45] Date of Patent: Apr. 18, 1989

[54] TUB AND SHOWER FLOOR HEAT EXCHANGER

[76] Inventor: Robert D. Sheffield, 4105 Oak St., Dunsmuir, Calif. 96025

[21] Appl. No.: 82,279

[22] Filed: Aug. 6, 1987

[51] Int. Cl.⁴ .............................. A47K 3/22; F24J 3/04
[52] U.S. Cl. ...................................... 165/47; 165/909; 4/545; 4/598
[58] Field of Search ...................... 165/47, 909; 4/545, 4/598

[56] References Cited

U.S. PATENT DOCUMENTS

| 1,703,655 | 2/1929 | Beakley et al. | |
|---|---|---|---|
| 3,263,242 | 8/1966 | Will | |
| 3,361,194 | 1/1968 | Cowlin | |
| 4,291,423 | 9/1981 | Wilson | 4/545 |
| 4,300,247 | 11/1981 | Berg | 165/909 |
| 4,304,292 | 12/1981 | Cardono et al. | 165/47 |
| 4,372,372 | 2/1983 | Hunter | 165/47 |
| 4,542,546 | 9/1985 | Desagagnes | 4/598 |
| 4,619,311 | 10/1986 | Vasile et al. | 165/47 |

FOREIGN PATENT DOCUMENTS

| 2304537 | 8/1974 | Fed. Rep. of Germany | 165/909 |
|---|---|---|---|
| 2502351 | 7/1976 | Fed. Rep. of Germany | 4/598 |
| 2724708 | 12/1978 | Fed. Rep. of Germany | 4/598 |
| 2855558 | 7/1980 | Fed. Rep. of Germany | 4/598 |
| 0167647 | 9/1984 | Japan | 4/545 |
| 7710668 | 4/1979 | Sweden | 4/598 |

Primary Examiner—Albert W. Davis, Jr.
Assistant Examiner—John K. Ford
Attorney, Agent, or Firm—Leonard D. Schappert

[57] ABSTRACT

A heat exchanger unit to be positioned in the floor area of a bathtub or shower stall which extracts heat from spent shower or bath water, transferring that heat to water yet to be supplied to the shower or bathtub, reducing the amount of hot water required from a water heater for comfortable bathing.

5 Claims, 2 Drawing Sheets

U.S. Patent   Apr. 18, 1989   Sheet 2 of 2   4,821,793
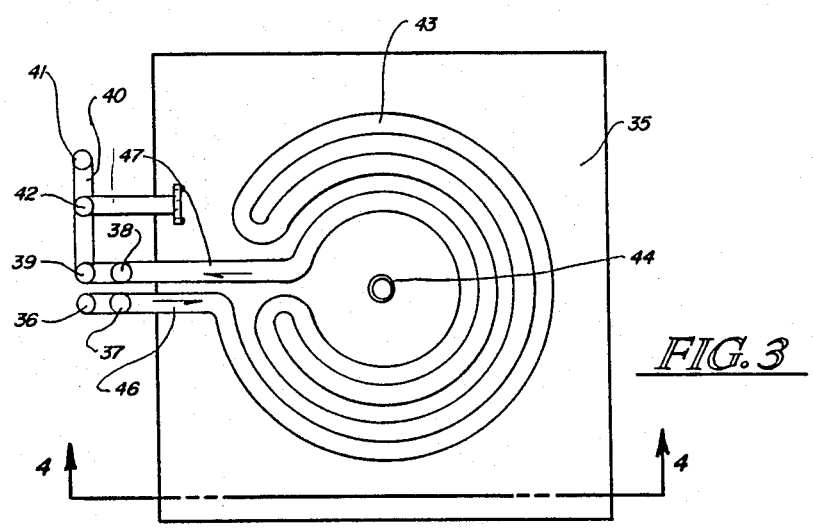
FIG. 3
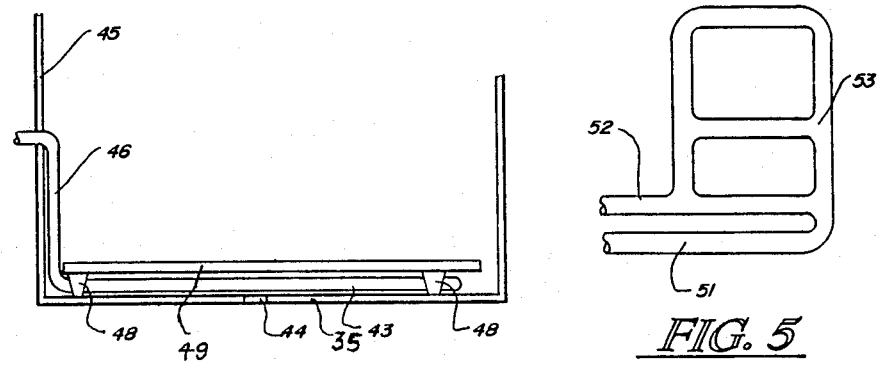
FIG. 4
FIG. 5
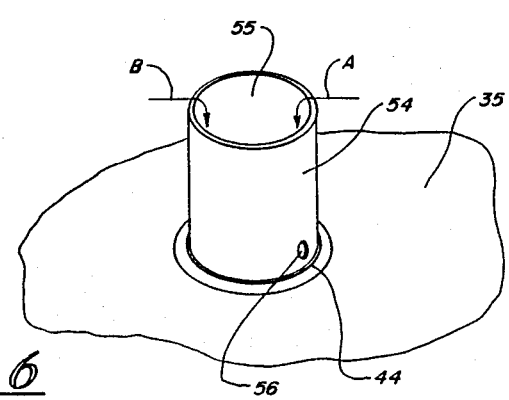
FIG. 6

4,821,793

TUB AND SHOWER FLOOR HEAT EXCHANGER

BACKGROUND OF THE INVENTION

1. Field of the Invention

The present invention relates generally to heat exchangers, and more specifically to heat exchangers designed to be positioned in the floor area of a tub or shower and designed in such a way that they are able to recover a considerable amount of heat from the water utilized n a bathtub or shower stall, thereby increasing the efficiency and economy of a shower or bathtub.

2. Description of the Prior Art

In the past, inventors have directed their efforts toward heat exchangers to reclaim energy from waste water utilizing a gravity arrangement. Some such heat exchangers have included a tube wrapped around a drain pipe of the bathtub to recover heat from water passing through the drain pipe. Other inventions have included a heat exchanger consisting of a piece of pipe lying on the floor of a shower and/or embedded in the floor of the shower so that water flowing over the floor of the shower preheats water flowing through the heat exchanger before entering the cold-water side of the shower.

SUMMARY OF THE INVENTION

The present invention comprises a heat exchanger unit positioned at the floor of a bathtub or shower stall and designed to extract heat from the spent shower or bath water and to transfer that heat to the cold water supplied to the shower or bathtub, thereby reducing the amount of hot water required from the water heater for comfortable bathing. The heat exchanger, which is positioned at the floor of the shower or tub, is connected to the cold-water inlet line so that cold water being routed to the shower head must first pass through the heat exchanger, thereby transferring heat from spent shower water to the cold-water inlet line and raising the temperature of the cold water before it reaches the shower head, with a resulting reduction in the amount of hot water to be supplied by the water heater.

One of the objects of the present invention is to recover heat from the spent water which exits a shower stall or bathtub and to reroute that heat to the incoming cold-water supply line through the insertion of a heat exchanger at the floor of the shower or tub.

Another object of the present invention is to reduce the energy required to supply hot water during any specific shower or bath by reducing the requiremet of the amount of heated water to be supplied by a conventional water heater.

A further object of the present invention is to provide a heat exchanger positioned at the floor of a bathtub or shower which includes a baffle arrangement to restrict the flow of spent water, with a resulting increase in efficiency of the shower/bathing system.

Another object of the present invention is to provide a heat exchanger for positioning at the floor of a tub or shower for preheating the cold incoming water and designed to be retrofitted to existing shower and tub arrangements.

The foregoing objects, as well as other objects and benefits of the present invention, are made more apparent by the descriptions and claims which follow.

BRIEF DESCRIPTION OF THE DRAWINGS

FIG. 3 of the drawings ia a top diagramatic view of an alternative heat exchanger showing the operation thereof in recovering heat from spent water utilized in bathing.

FIG. 4 is a side view of the heat exchanger tube and cover, as well as the floor area of FIG. 3, taken along lines 4—4 of FIG. 3 to show the arrangement of the heat exchanger for use with a shower stall.

FIG. 5 is a diagramatic view showing an alternative heat exchanger of the manifold type for use in the present invention.

FIG. 6 of the drawings is an expanded view showing the modification to the drain of a shower stall to increase the efficiency of the heat exchanger taught herein.

DESCRIPTION OF THE PREFERRED EMBODIMENT

Figure 1:
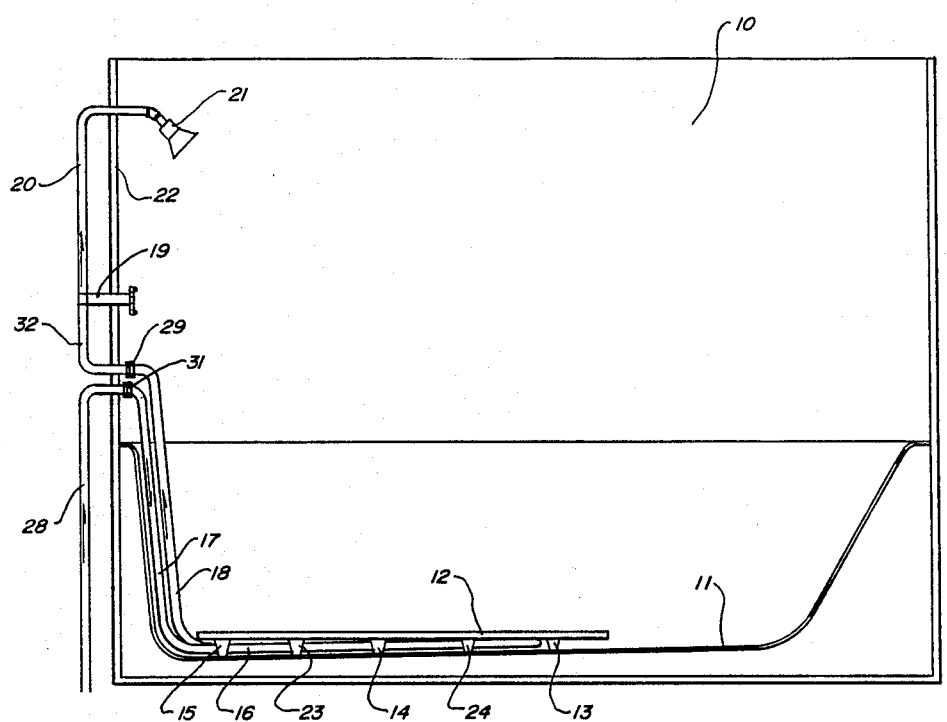
FIG. 1 of the drawings is a diagramatic view of a shower system utilizing the techniques of the present invention to achieve increased efficiency in bathing.

FIG. 1 of the drawings illustrates a shower floor heat exchanger utilizing the present invention. The tub bottom 11 of tub/shower stall 10 utilizes a drain 34 shown in FIG. 2, and tub bottom 11 is oriented in a generally downward direction toward drain 34. A heat exchanger tube 16 is connected by means of water line 17 and connector 31 to cold-water supply line 28, and by means of water line 18 and connector 29 to water line 32, which is routed to the mixer/faucet 19 to be mixed with hot water from the hot-water supply line 33 shown in FIG. 2 of the drawings. The water from mixer/faucet 19 is routed through water line 20 to a shower head 21 to be utilized in the shower process. A heat exchanger cover 12 having supports 13, 14, 15, 23 and 24 is utilized to provide a floor for an individual to stand on during showering.

Figure 2:
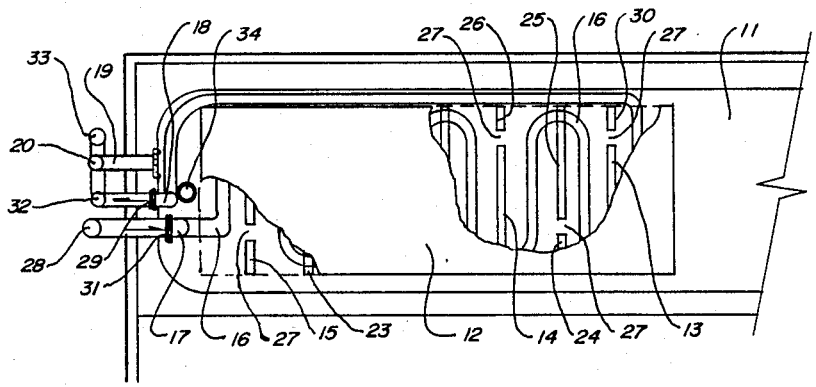
FIG. 2 of the drawings ia a top view of a portion of the tub/shower stall shown in FIG. 1, including appropriate cutaways to expose the structure of the heat exchanger utilized in recovering heat from the spent water in the shower stall.

FIG. 2 shows part of tub bottom 11 of tub/shower stall 10 with the heat exchanger of the present invention in position, with appropriate cutaways to show the baffle arrangement which maximizes the efficiency of the heat exchanger. Attachment to the water supply system is also shown in greater detail. Cold water coming from the water supply system is also shown in greater detail. Cold water coming from the water supply system comes into the heat exchanger tube 16 from cold-water supply line 28 through coupling 31 and water line 17, which is attached to heat exchanger tube 16. The water then flows through heat exchanger tube 16 along a tortuous path defined by the bending of heat exchanger tube 16, back out through water line 18, through coupling 29 and through water line 32 to mixer/faucet 19 to be mixed with hot water coming from hot-water supply line 33. The mixed water is then routed through water line 20 to shower head 21 of FIG. 1. As cold water flows through heat exchanger tube 16, it flows over the tortuous path created by the hairpin bends in heat exchanger tube 16 as shown in the drawings. Water from shower head 21 strikes tub bottom 11, and as it flows toward drain 34, it is forced back and forth over an extended path by means of the baffle system created by supports 13, 14, 15, 23, 24, 25, 26, 30 ad other similar supports. Openings 27, offset from each other, force the water over a tortuous, extended course, thereby increasing the time during which spent water is in a heat-exchange relationship with heat exchanger tube 16, and extracting a greater amount of energy from the spent water flowing past heat exchanger tube 16 than would normally be retrieved. Supports 13, 14, 15, 23 and 24, as well as 25, 26, 30 and other supports not shown, act not only as supports to hold cover 12 in a stable position so that an individual using the tub/shower stall 10 can stand thereon during a shower, but also as walls to ensure that spent water follows the desired tortuous course.

FIG. 3 is a diagramatic view of an alternative heat exchanger unit designed specifically for use with a shower stall. In this arrangement, the heat exchanger includes a heat exchanger tube 43 bent in a semicircular fashion to create a considerable amount of heat exchange area by means of which heat from spent water coming from a shower head as shown in FIG. 1 of the drawings is transferred to cold water flowing through heat exchanger tube 43. Heat exchanger tube 43 is positioned on floor area 35 of shower stall 45, and a drain 44 is provided in floor area 35. Cold water flows from cold-water supply line 36 to coupling 37 to water line 46, through heat exchanger tube 43 and through water line 47 to coupling 38 and through water line 39 to mixer/faucet 40, to be mixed with hot water coming from hot-water supply line 41. Mixed water from mixer/faucet 40 is then routed to mixed-water line 42 to a shower head as shown in FIG. 1 of the drawings. As a result of the tortuous path over which cold water flowing through heat exchanger tube 43 passes, a considerable amount of heat is extracted from warm or hot spent water sitting on the floor area 35 of shower stall 45.

FIG. 4 of the drawings is a diagramatic view of the heat exchanger unit shown in FIG. 3 taken along lines 4—4 of FIG. 3. A cover 49 is provided with legs 48 to hold it above heat exchanger tube 43 to allow an individual showering the the shower stall 45 to stand above heat exchanger tube 43. FIG. 6, viewed together with FIG. 4, shows that a drain restricter 54 consisting of a piece of tubing having a hole 55 therethrough and a second hole 56 is positioned to communicate with drain 44. The purpose of drain restricter 54 is to ensure that the water level in the floor area 35 of shower stall 45 is sufficiently high to cover heat exchanger tube 43 so as to maximize the efficiency of the heat exchange resulting from the contact of the hot spent water with heat exchanger tube 43 and the cold water flowing through heat exchanger tube 43. A small hole 56 is provided in the side of drain restricter 54 to allow continual draining of a small amount of water and ultimate draining of substantially all of the water left in the floor area 35 of shower stall 45 after the showering process. As a practical matter, during showering the level of the water in the floor rea 35 of shower stall 45 builds up to the top of drain restricter 54 and flows into hole 55 of drain restricter 54 along arrows A and B.

FIG. 5 of the drawings shows an alternative heat exchanger tube 50. Heat exchanger tube 50 is fashioned in the form of a manifold 53, and provides for parallel flow of cold water coming in through cold-water supply line 51 and exiting through heat exchanger tube out-line 52.

While the foregoing description of the invention has shown preferred embodiments using specific terms, such description is presented for illustrative purposes only. It is applicant's intention that changes and variations may be made without departure from the spirit or scope of the following claims, and this disclosure is not intended to limit applicant's protection in any way.

I claim:

1. A heat exchanger for use in extracting heat from spent bathing water and transferring said heat to water in a domestic water supply, comprising:

a heat exchanger tube extendng over a tortuous path and having an inlet and an outlet;

first connecting means for connecting said inlet of said heat exchanger tube to a domestic water supply line;

second connecting means for connecting said outlet of said heat exchanger tube to a water delivery line, and a heat exchanger cover constructed of a sheet of substantially imperforate material having a top surface and a bottom surface and legs attached to and extending downward from said bottomsurface, said sheet of material from which said heat exchanger cover is constructed being substantially imperforate so that, when said heat exchanger tube is positioned on the floor of a bathing stall and said heat exchanger cover is positioned above said heat exchanger tube, said legs of said heat exchanger cover hold said sheet of substantially imperforate material above said heat exchanger tube.

whereby said spent water contacting said top surface of said sheet of substantially imperforate material is forced to flow around the edges of said sheet of substantially imperforate material and over a path defined by said bathing stall, said legs of said heat exchanger cover and said bottom surface of said sheet of substantially imperforate material, contacting said heat exchanger tube, thereby transferring heat from said spent bathing water to water inside of said heat exchanger tube.

2. The invention of claim 1, wherein:

said heat exchanger tube bends back and forth several times to increase the length of said heat exchanger tube exposed to said spent bathing water and said legs of said heat exchanger cover are placed between portions of said heat exchanger tube to act as a baffle, forcing said spent bathing water over a tortuous path in contact with said heat exchanger tube, thereby increasing efficiency of said heat exchanger.

3. The invention of claim 1, including a drain restricter consisting substantially of a hollow tube having a top end and a bottom end, sized so that said bottom end fits into a drain, thereby restricting the flow of said spent bathing water, whereby said spent bathing water is kept in substantially full contact with said heat exchanger tube during bathing to increase the efficiency of said heat exchanger.

4. The invention of claim 1, wherein said heat exchanger tube is curved in a substantially circular shape to increase the length of said heat exchanger tube exposed to said spent bathing water.

5. The invention of claim 1, wherein said heat exchanger tube consists of a manifold having several substantially parallel lines connected between said inlet and said outlet of said heat exchanger tube.

* * * * *